United States Patent
Yamada et al.

(10) Patent No.: US 8,170,874 B2
(45) Date of Patent: May 1, 2012

(54) APPARATUS AND METHOD FOR RECOGNIZING SPEECH BASED ON FEATURE PARAMETERS OF MODIFIED SPEECH AND PLAYING BACK THE MODIFIED SPEECH

(75) Inventors: Masayuki Yamada, Kawasaki (JP); Toshiaki Fukada, Yokohama (JP); Yasuo Okutani, Kawasaki (JP); Michio Aizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 973 days.

(21) Appl. No.: 12/165,793

(22) Filed: Jul. 1, 2008

(65) Prior Publication Data
US 2009/0012790 A1 Jan. 8, 2009

(30) Foreign Application Priority Data

Jul. 2, 2007 (JP) .................................. 2007-174571
Jun. 17, 2008 (JP) .................................. 2008-158555

(51) Int. Cl.
*G10L 15/00* (2006.01)
*G10L 21/00* (2006.01)

(52) U.S. Cl. ......... 704/251; 704/235; 704/243; 704/244
(58) Field of Classification Search .................. 704/235, 704/243, 244, 251
See application file for complete search history.

(56) References Cited

U.S. PATENT DOCUMENTS 4,181,821 A * 1/1980 Pirz et al. ...................... 704/252
6,490,558 B1 * 12/2002 Kahn et al. .................... 704/235
2003/0182111 A1 * 9/2003 Handal et al. ................. 704/231
2009/0034754 A1 * 2/2009 Archibald et al. ........... 381/94.1

OTHER PUBLICATIONS

L. Rabiner and B-H. Juang (authors), and Sadaoki Furui (translation supervisor), "Fundamentals of Speech Recognition (vol. 1 & 2)", NTT Advanced Technology (1995).
Miwako Torii, Hirofumi Nakanishi, Mitsuhiko Kai, and Seiichi Nakagawa, "An Isolated Spoken Word Recognition System with Capability of Registration of New Words", Proceedings of Autumn Meeting of Acoustical Society of Japan, 2-2-2, pp. 39-40 (1995).

* cited by examiner

*Primary Examiner* — Vincent P Harper
(74) *Attorney, Agent, or Firm* — Carter, DeLuca, Farrell & Schmidt LLP (57) ABSTRACT

A speech recognition apparatus which improves the sound quality of speech output as a speech recognition result is provided. The speech recognition apparatus includes a recognition unit, which recognizes speech based on a recognition dictionary, and a registration unit, which registers a dictionary entry of a new recognition word in the recognition dictionary. The recognition unit includes a generation unit, which generates a dictionary entry including speech of the new recognition word item and feature parameters of the speech, and a modification unit, which makes a modification for improving the sound quality of the speech included in the dictionary entry generated by the generation unit. The recognition unit includes a speech output unit, which outputs speech which is included in a dictionary entry corresponding to the recognition result of input speech, and is modified by the modification unit.

4 Claims, 9 Drawing Sheets

PRESS REGISTRATION BUTTON AGAIN
AFTER PRESSING OF KEY
(PLURAL DESIGNATIONS ALLOWED)
CORRESPONDING TO INPUT SPEECH

FIG. 5

1. EFFECT SOUND 1
2. EFFECT SOUND 2
3. "FATE"
4. "CANON"
5. "STING"
6. (NO EFFECT SOUND)

DURING SPEECH OUTPUT

- ● ADD EFFECT SOUND
- ○ NOT ADD EFFECT SOUND

START POSITION OF EFFECT SOUND

- ○ BEFORE TALKBACK
- ● SIMULTANEOUS WITH TALKBACK
- ○ AFTER TALKBACK

APPARATUS AND METHOD FOR RECOGNIZING SPEECH BASED ON FEATURE PARAMETERS OF MODIFIED SPEECH AND PLAYING BACK THE MODIFIED SPEECH

BACKGROUND OF THE INVENTION

1. Field of the Invention

The present invention relates to a speech recognition technique.

2. Description of the Related Art

Speech recognition includes that of text registration type, and that of speech registration type. In speech recognition of text registration type, text registered as a speech recognition target word (speech recognition candidate) is converted into a phoneme sequence, and an acoustic model sequence corresponding to the converted phoneme sequence is used in recognition processing. By contrast, in speech recognition of speech registration type, acoustic parameters such as a cepstrum and the like are extracted from speech recorded as a speech recognition target word by signal processing. Alternatively, speech recorded as a speech recognition target word undergoes phoneme recognition or model sequence matching to obtain a phoneme sequence or model sequence, whichever is best for expresses that speech. The obtained acoustic parameters, phoneme sequence, or model sequence are used in recognition processing.

Upon execution of speech recognition, a recognition result is often presented (output) to the user to allow the user to confirm whether recognition has been successful.

In the case of speech recognition of text registration type, the registered text is normally output as information used to confirm the recognition result. On the other hand, in speech recognition of speech registration type, the speech upon registration is output as information used to confirm the recognition result.

As described above, in speech recognition of speech registration type, speech upon registration is output for the purpose of confirmation of the recognition result. However, the speech upon registration is not the one in an ideal environment such as a soundproof room, but is the one in an actual environment where a speech recognition apparatus is operated. That is, the speech registered as speech recognition target word includes background noise and the like. At the time of speech registration, the user does not always start utterance immediately, and recording does not always end as soon as the utterance ends. Hence, unwanted silent periods are often added before and after the registered speech.

For this reason, in speech recognition of speech registration type, the speech output for the purpose of confirmation of the speech recognition result is hard to hear.

SUMMARY OF THE INVENTION

A speech recognition apparatus which improves the sound quality of speech output as a speech recognition result is provided. The speech recognition apparatus includes a recognition unit, which recognizes speech based on a recognition dictionary, and a registration unit, which registers a dictionary entry of a new recognition word in the recognition dictionary. The recognition unit includes a generation unit, which generates a dictionary entry including speech of the new recognition word item and feature parameters of the speech, and a modification unit, which makes a modification for improving the sound quality of the speech included in the dictionary entry generated by the generation unit. The recognition unit includes a speech output unit, which outputs speech which is included in a dictionary entry corresponding to the recognition result of input speech, and is modified by the modification unit.

Further features and aspects of the present invention will become apparent from the following description of exemplary embodiments with reference to the attached drawings.

DESCRIPTION OF THE EMBODIMENTS

Various exemplary embodiments, features, and aspects of the present invention will be described in detail below with reference to the drawings. The present invention is not limited by the disclosure of the embodiments and all combinations of the features described in the embodiments are not always indispensable to solving means of the present invention.

Figure 1:
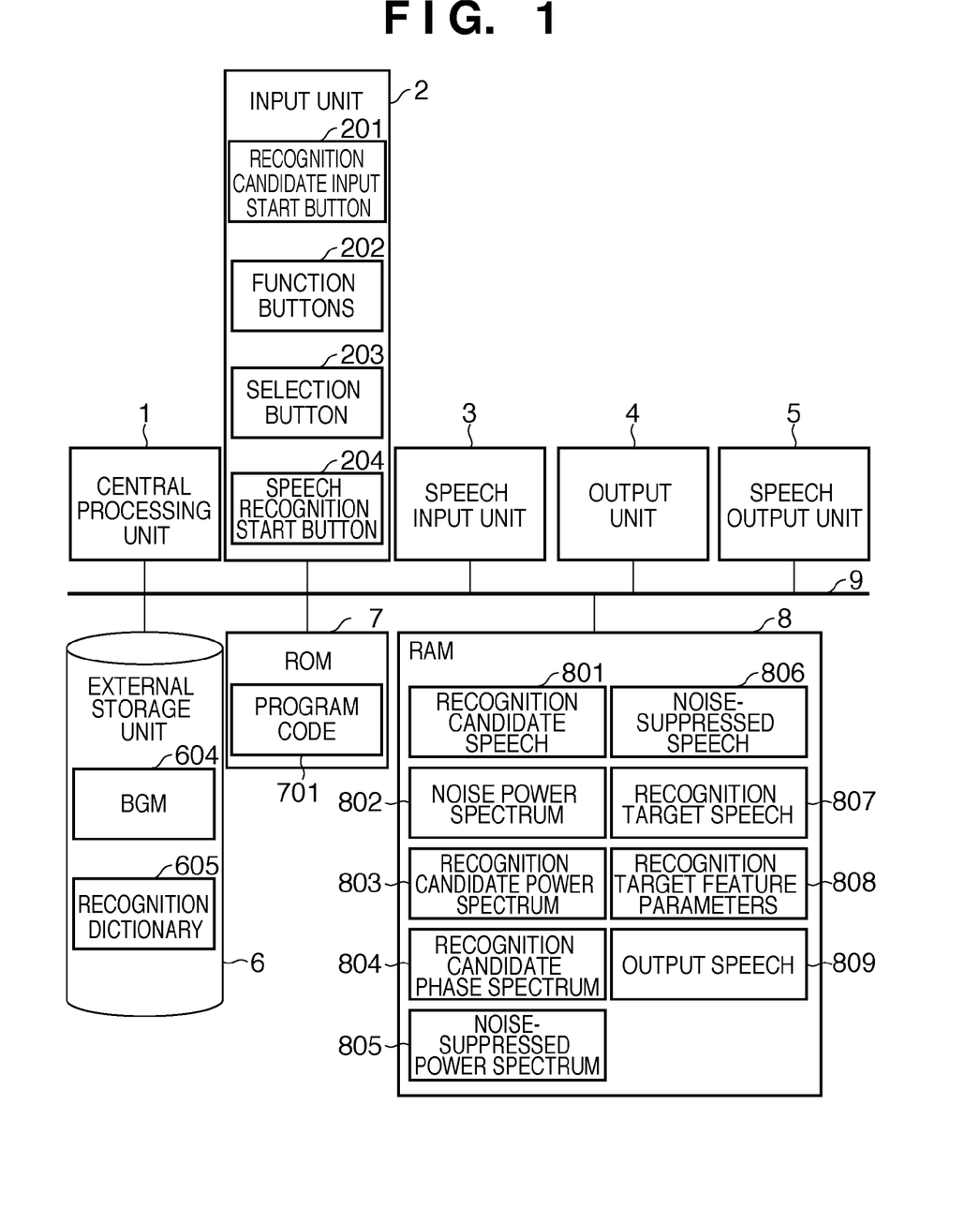
FIG. 1 is a block diagram showing the hardware arrangement of a speech recognition apparatus according to an embodiment.
Figure 3:
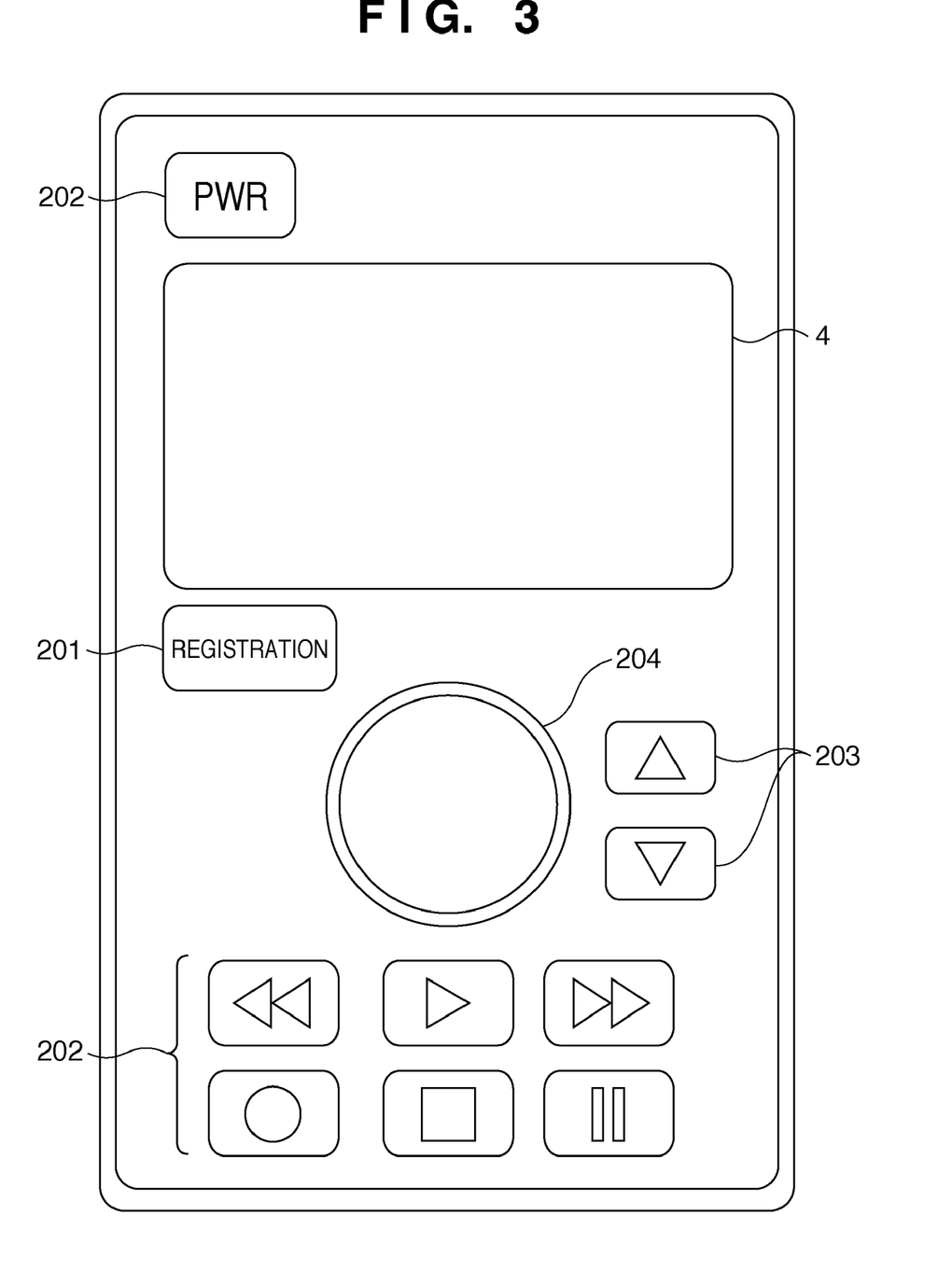
FIG. 3 shows an example of the outer appearance of the speech recognition apparatus according to the embodiment.

FIG. 1 is a block diagram showing the hardware arrangement of a speech recognition apparatus according to this embodiment, and FIG. 3 shows an example of the outer appearance of that speech recognition apparatus.

A central processing unit 1 is a control unit for executing processing such as numeric calculations, control, and the like, and executes calculations according to the sequence to be described later.

An input unit 2 comprises a touch panel, keyboard, buttons, and the like, and is used by the user to input operation instructions to this apparatus. More specifically, this input unit 2 includes a recognition candidate input start button (registration button) 201, function buttons 202, selection button 203, and speech recognition start button 204. These buttons 201 to 204 may be independent buttons, as shown in FIG. 3, or may be virtual buttons displayed on a liquid crystal touch panel. Alternatively, a single button may be selectively used according to situations.

A speech input unit 3 is used to input a user's utterance, and comprises a microphone and the like. An output unit 4 presents image information to the user, and typically comprises an image output device such as a liquid crystal display device. On the other hand, a speech output unit 5 outputs speech to the user, and comprises a loudspeaker and the like. Note that the output unit 4 may be commonly used together with the speech output unit 5. Furthermore, the output unit 4 may be a simple one like only the flickering of a lamp.

Figure 5:
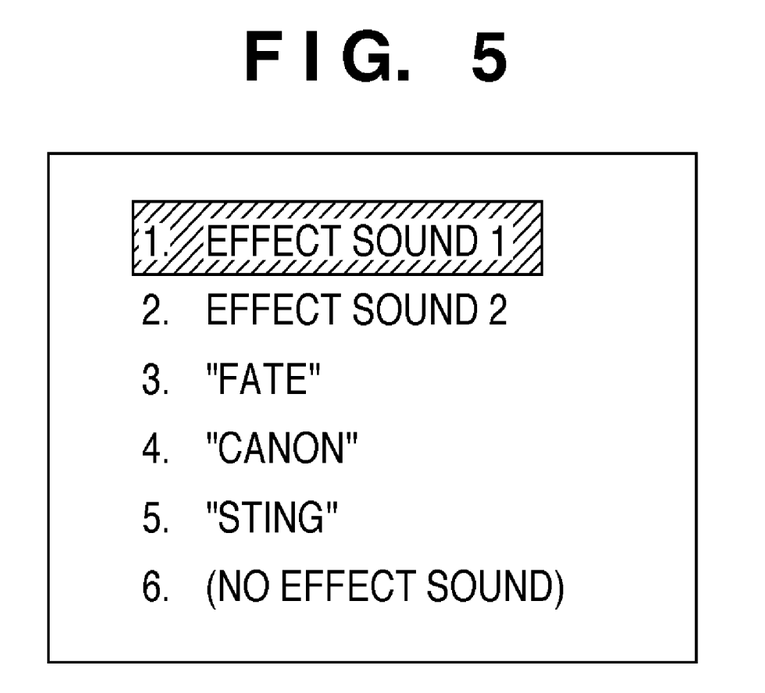
FIG. 5 shows an example of the contents output to the output unit upon selection of BGM.
Figure 6:
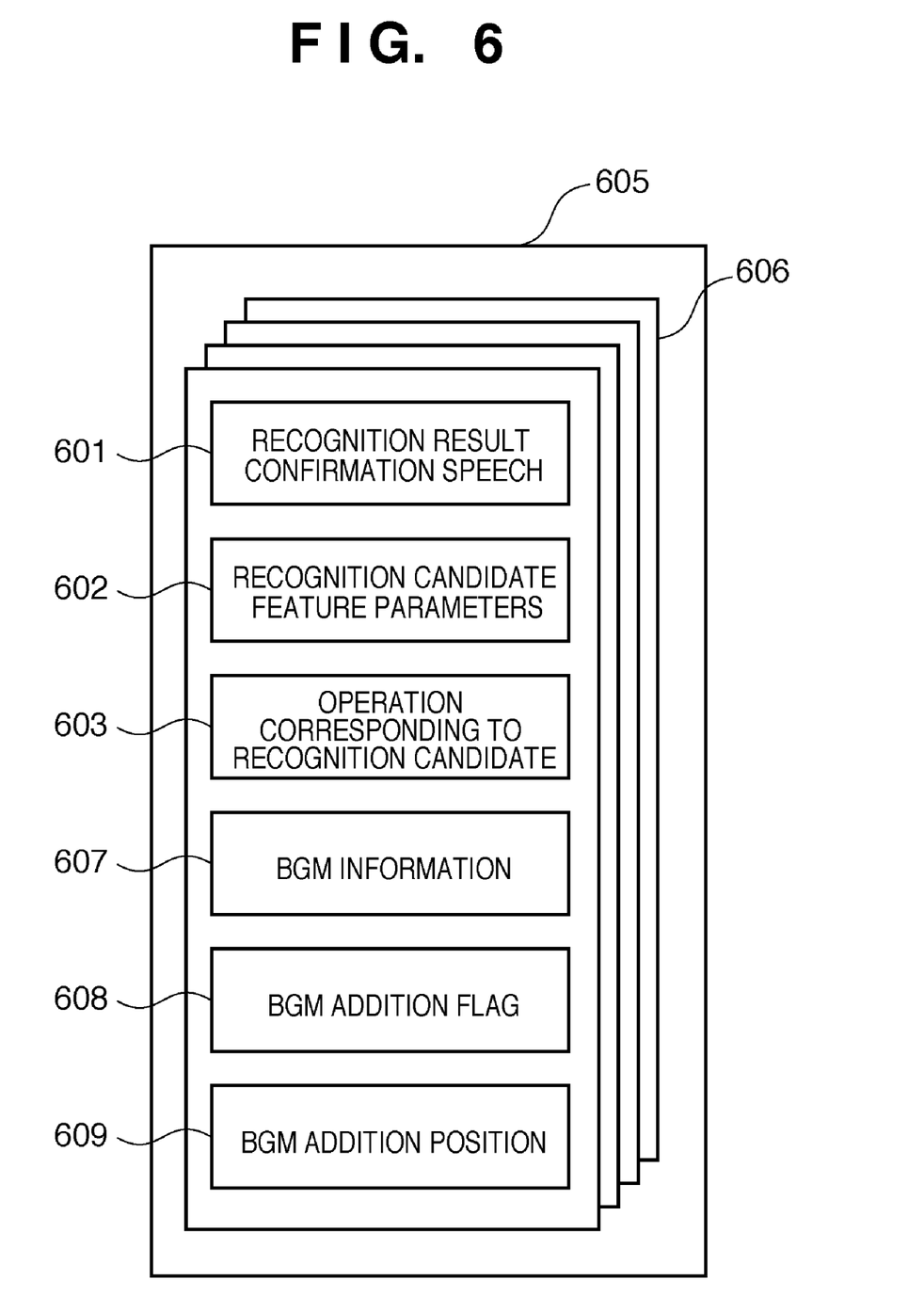
FIG. 6 is a view showing an example of the internal structure of a recognition dictionary according to the embodiment.

An external storage unit 6 comprises a hard disk drive, nonvolatile memory, and the like, and holds background sounds (to be abbreviated as "BGM" hereinafter) 604, recognition dictionary 605, and the like, as shown in FIG. 1. The recognition dictionary 605 includes a plurality of dictionary entries 606, as shown in FIG. 6, and one dictionary entry corresponds to one recognition candidate. Furthermore, each dictionary entry includes recognition result confirmation speech 601, recognition candidate feature parameters 602, operation corresponding to recognition candidate 603, BGM information 607, a BGM addition flag 608, and a BGM addition position 609. The recognition result confirmation speech 601 is speech data used for confirmation of a recognition result. The recognition candidate feature parameters 602 indicate the feature of speech input as a recognition candidate, and are used in speech recognition. The BGM 604 includes a plurality of types of effect sounds or music pieces shown, for example, in FIG. 5 and the BGM information 607 indicates the correspondence between the BGM 604 and dictionary entries 606. The BGM addition flag 608 controls the presence/absence of BGM addition. The BGM addition position 609 is information for controlling a position where BGM is to be added to the recognition result confirmation speech. Note that the external storage unit 6 may comprise a portable storage medium such as a CD-ROM, memory card, or the like, and the use of such media can improve convenience.

A ROM 7 is a read-only memory, and stores a program code 701 required to implement the present invention, permanent data (not shown), and the like. However, the external storage unit 6 and ROM 7 may be arbitrarily used. For example, the program code 701 may be installed in the external storage unit 6 in place of the ROM 7. Conversely, the BGM 604 and the like may be stored in the ROM 7.

A RAM 8 is a memory for temporarily holding information, and holds temporary data, various flags, and the like. As shown in FIG. 1, the RAM 8 stores speech 801 input as a recognition candidate, and pieces of information 802 to 806 obtained by processing the input speech 801. Furthermore, the RAM 8 stores speech 807 input as a speech recognition target and its feature parameters 808, and output speech 809 for the purpose of confirmation of the recognition result. The RAM 8 is also selectively used together with the external storage unit 6 and ROM 7. For example, temporary data with a large size may be held in the external storage unit 6. Alternatively, a compressed program code stored in the ROM 7 may be decompressed on the RAM 8.

The aforementioned central processing unit 1, input unit 2, speech input unit 3, output unit 4, speech output unit 5, external storage unit 6, ROM 7, and RAM 8 are connected to a bus 9.

Figure 2A:
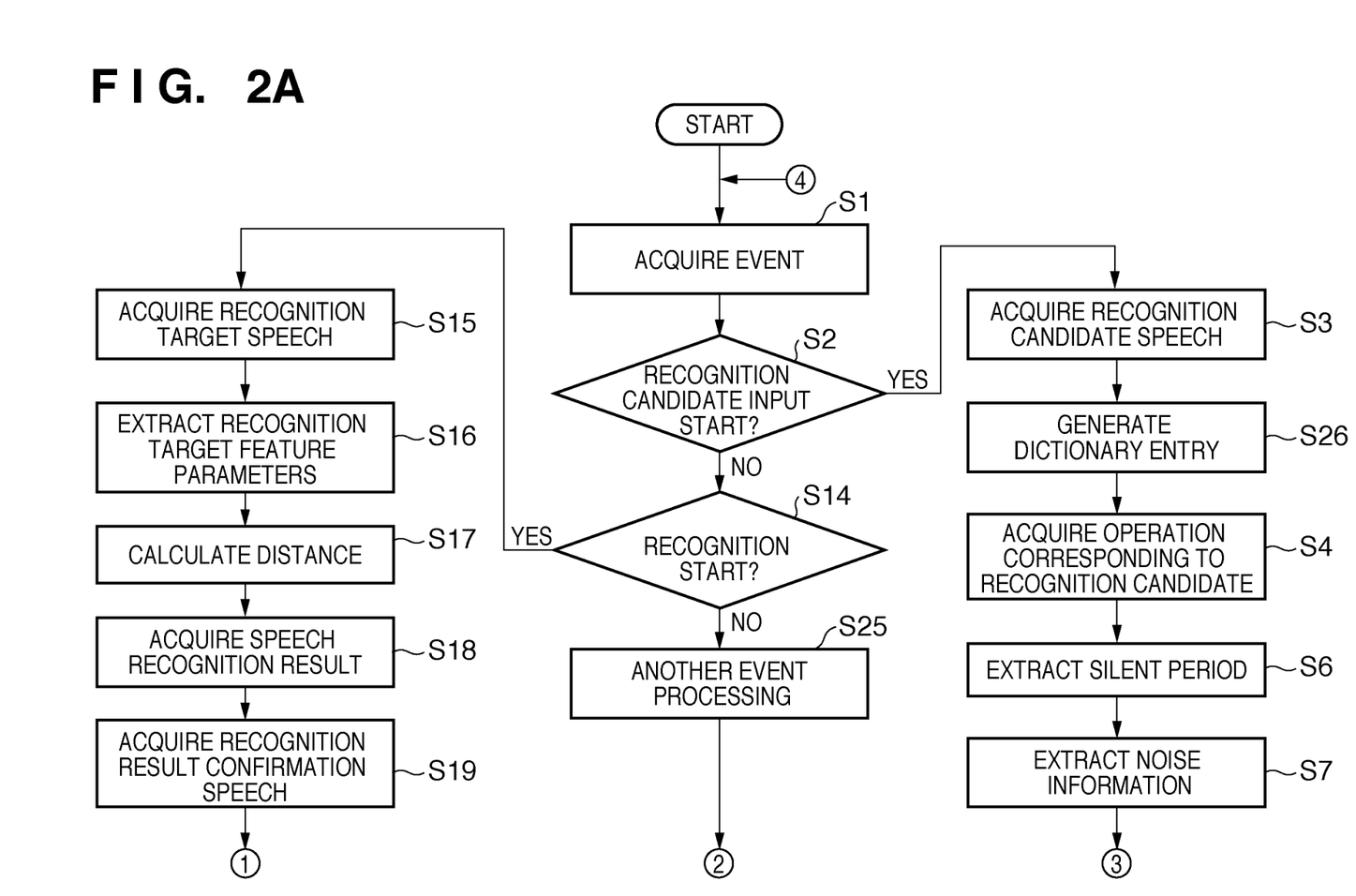
FIGS. 2A and 2B are flowcharts showing the speech recognition processing sequence according to the embodiment.
Figure 2B:
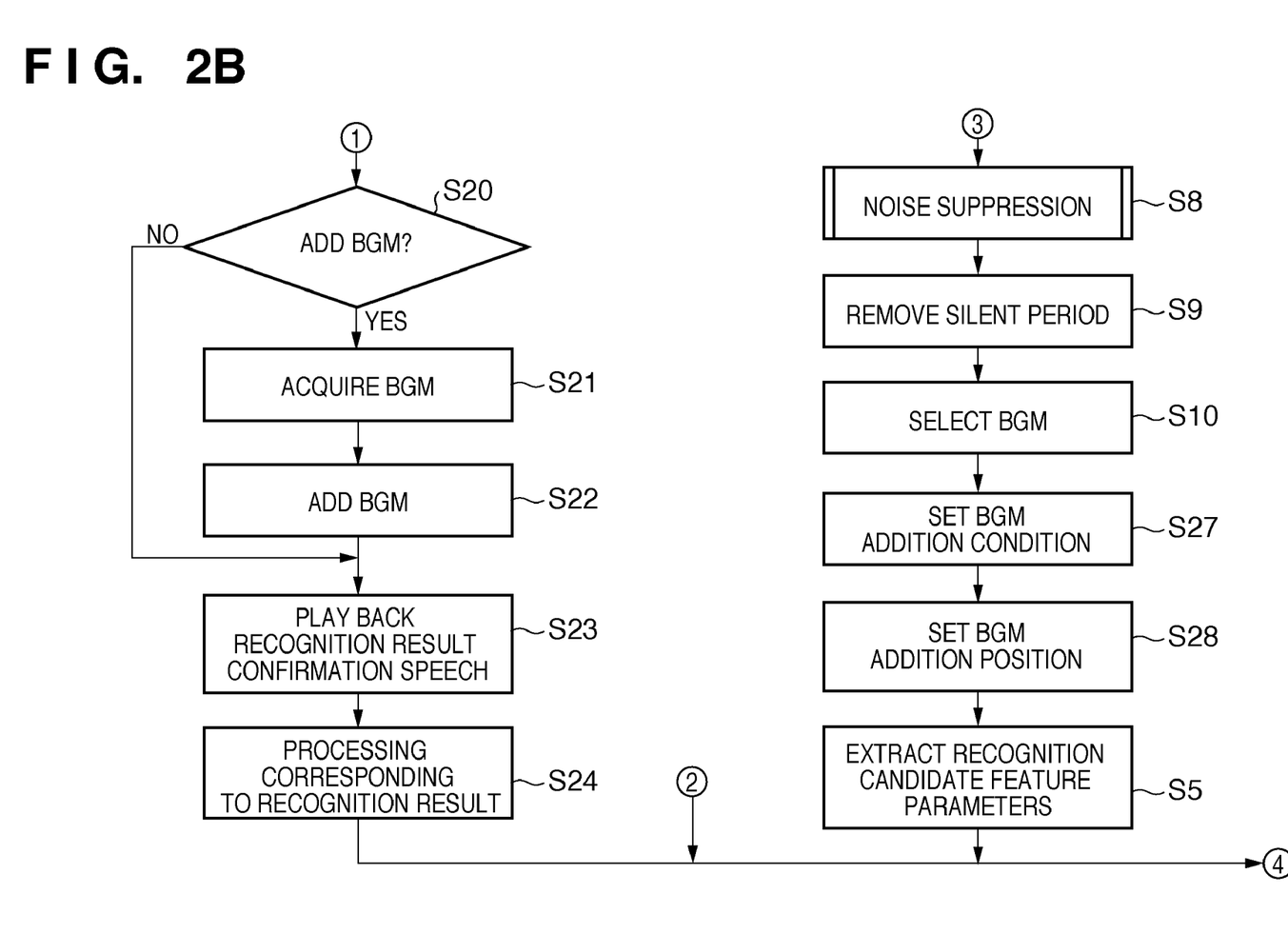

FIGS. 2A and 2B are flowcharts showing the speech recognition processing sequence of this embodiment. A program corresponding to this flowchart is included in the program code 701, and is executed by the central processing unit 1. In this embodiment, speech recognition of speech registration type is implemented. Note that this embodiment adopts speech recognition which is driven in response to reception of an event. However, the present invention is not limited to this, and speech recognition which is driven by polling or the like may be adopted.

In step S1, the central processing unit 1 acquires a new event. As soon as the new event is acquired, the process advances to next step S2. An example of events acquired in step S1 includes pressing of a button such as the recognition candidate input start button (registration button) 201, function button 202, and the like.

The central processing unit 1 checks in step S2 if the event acquired in step S1 is pressing of the recognition candidate input start button (registration button) 201. If the acquired event is pressing of the recognition candidate input start button (registration button) 201, the process advances to recognition word registration processing in step S3 and subsequent steps.

In the recognition word registration processing, in step S3 the central processing unit 1 acquires an utterance (recognition candidate speech) of a word to be used as a new speech recognition candidate from the speech input unit 3. The central processing unit 1 stores the acquired speech in the RAM 8 as the recognition candidate speech 801.

In step S26, the central processing unit 1 generates a new dictionary entry in the recognition dictionary 605.

Figure 4:
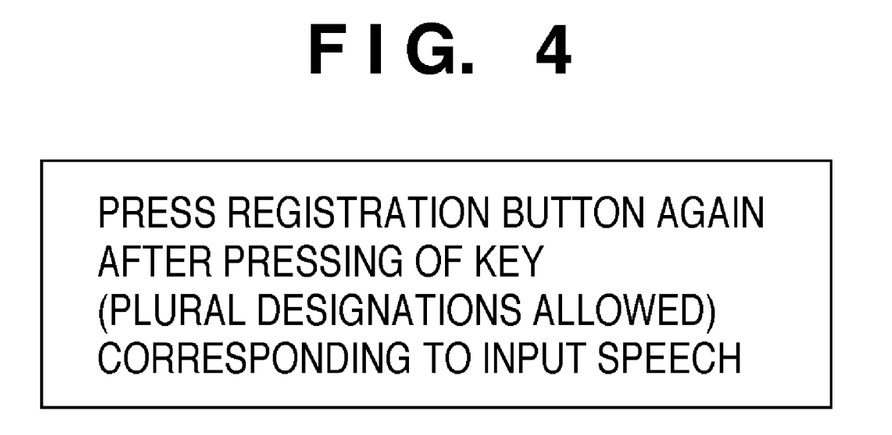
FIG. 4 shows an example of the contents output to an output unit upon acquisition of a recognition candidate ID.

In step S4, the central processing unit 1 acquires an operation corresponding to the recognition candidate speech acquired in step S3. The central processing unit 1 displays a message shown, for example, in FIG. 4 on the output unit 4. The central processing unit 1 records a key code corresponding to one of the function buttons 202 pressed after the message is displayed in the recognition candidate corresponding operation 603 in the dictionary entry generated in step S26 until the recognition candidate start button is pressed.

In step S6, the central processing unit 1 extracts silent periods of the recognition candidate speech. As a determination method of silent periods, periods with small power located at the two ends of the recognition candidate speech can be determined as silent periods. Furthermore, power variations or the frequency analysis result of the recognition candidate speech may be used.

In step S7, the central processing unit 1 extracts information of noise (noise information) included in the recognition candidate speech. In this embodiment, an average power spectrum of the silent periods extracted in step S6 is used as noise information. Assuming stationarity of noise, it is considered that the power spectrum of the silent periods is equivalent to that of noise included in the recognition candidate speech. Therefore, the average power spectrum of the silent periods can be used as noise information. The central processing unit 1 stores the extraction result in the RAM 8 as a noise power spectrum 802.

In step S8, the central processing unit 1 suppresses noise of the recognition candidate speech based on the noise information extracted in step S7. The central processing unit 1 stores the recognition candidate speech in which the noise is suppressed in the RAM 8 as noise-suppressed speech 806. As a method of suppressing noise, a known technique used in speech recognition and speech emphasis may be used.

Figure 8:
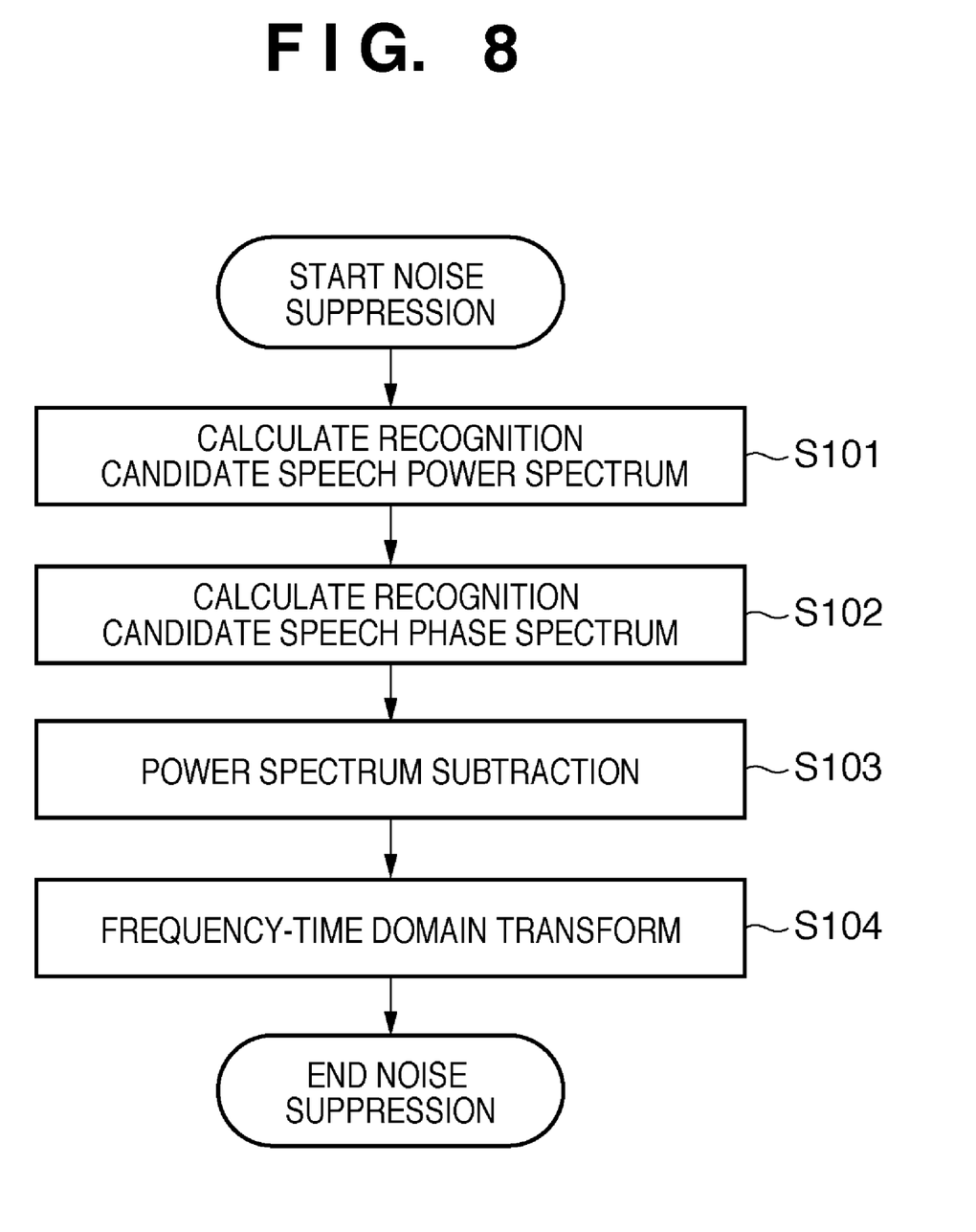
FIG. 8 is a flowchart showing the noise suppression processing sequence.

An example of the process of this noise suppression will be described below with reference to FIG. 8.

In step S101, the central processing unit 1 calculates the power spectrum of the recognition candidate speech 801, and stores the calculated power spectrum in the RAM 8 as a recognition candidate power spectrum 803.

In step S102, the central processing unit 1 calculates the phase spectrum of the recognition candidate speech, and stores the calculated phase spectrum in the RAM 8 as a recognition candidate phase spectrum 804.

In step S103, the central processing unit 1 subtracts the noise power spectrum from the recognition candidate power spectrum. The central processing unit 1 stores a power spectrum obtained as the subtraction result in the RAM 8 as a noise-suppressed power spectrum 805.

The central processing unit 1 executes frequency-time domain transform of the noise-suppressed power spectrum to restore it to a time domain signal. At this time, the recognition candidate phase spectrum is used as phase information. A signal obtained as the transform result is speech obtained by suppressing noise from the recognition candidate speech, and the central processing unit 1 stores that signal in the RAM 8 as noise-suppressed speech 806.

The noise suppression sequence has been described.

After the noise suppression, the central processing unit 1 removes the silent periods extracted in step S6 from the noise-suppressed speech 806 in step S9. The central processing unit 1 stores the recognition candidate speech, in which noise is suppressed and the silent periods are removed in the dictionary entry generated in step S26, as the recognition result confirmation speech 601.

In step S10, the central processing unit 1 selects BGM for the recognition candidate speech from the BGM 604 stored in the external storage unit 6. For example, the central processing unit 1 displays a music piece list included in the BGM 604, as shown in FIG. 5, on the output unit 4, and selects BGM upon pressing of the selection button 203 (user's selection operation). The central processing unit 1 stores information of the selection result in the BGM information 607 in the dictionary entry generated in step S26. Note that "no BGM" may be displayed as a selection candidate, as shown in FIG. 5. In this case, the contents of the BGM information 607 are "empty".

Figure 7:
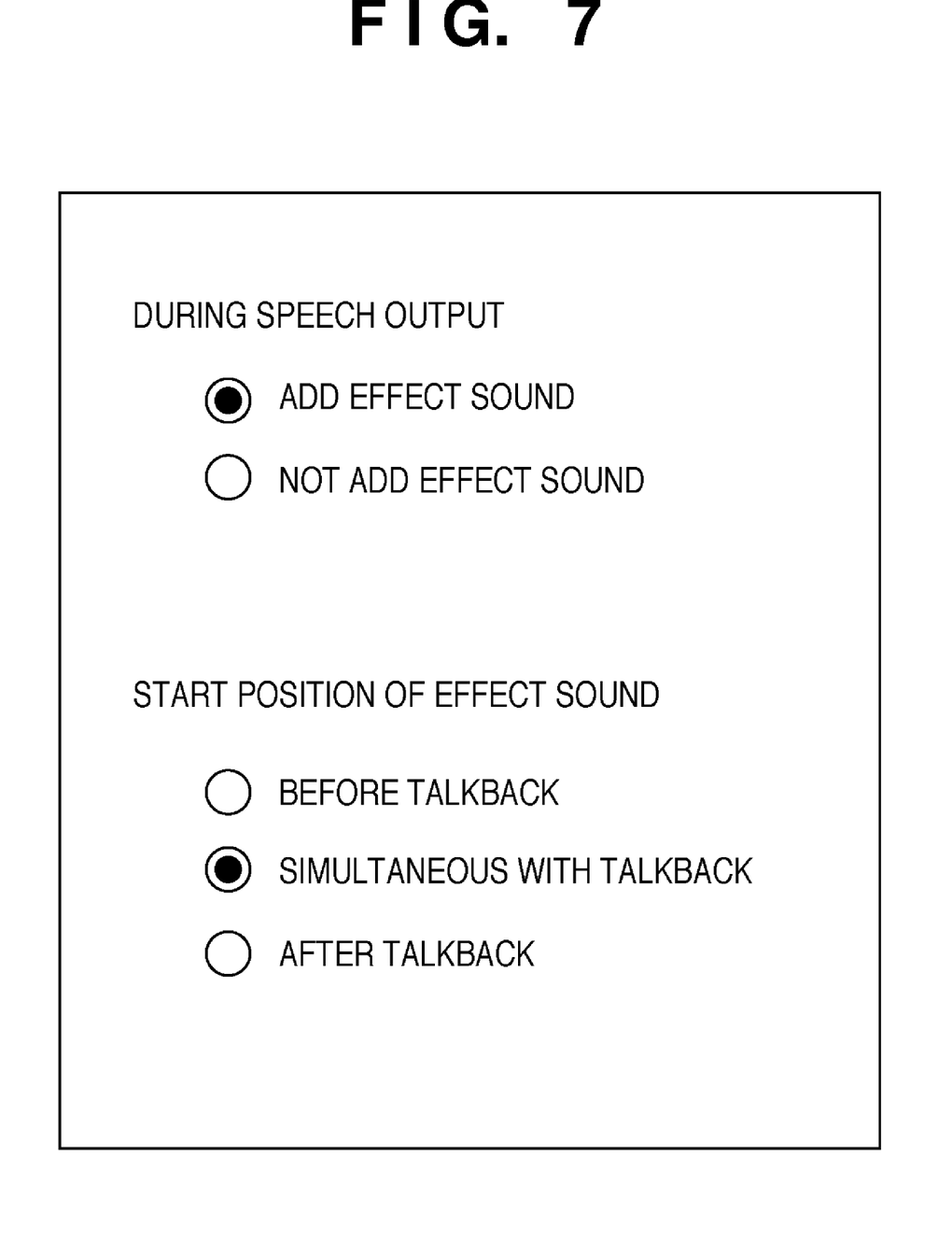
FIG. 7 shows an example of the contents output to the output unit upon setting a BGM addition condition and BGM addition position.

In step S27, the central processing unit 1 sets a condition upon adding the BGM. In this embodiment, whether or not to add the BGM even during playback of another speech or music piece is set as the condition upon adding the BGM. Such setting is attained by displaying a dialog shown in FIG. 7, and detecting pressing of the selection button 203. The central processing unit 1 stores the set condition in the BGM addition flag 608 in the dictionary entry generated in step S26 to have "1" as a case in which the BGM is added even during playback of another speech or music piece or "0" as another case.

In step S28, the central processing unit 1 sets a position where the BGM is to be added. That is, the central processing unit 1 sets the relationship between the start times of the recognition result confirmation speech and BGM. As in step S27, this setting is attained by displaying the dialog shown in FIG. 7, and detecting pressing of the selection button 203. The central processing unit 1 stores the set information in the BGM addition position 609 in the dictionary entry generated in step S26.

In step S5, the central processing unit 1 extracts feature parameters of the recognition candidate speech. More specifically, the central processing unit 1 extracts a cepstrum from the recognition candidate speech 801, and sets the extracted cepstrum as feature parameters. Alternatively, the central processing unit 1 sets, as feature parameters, a phoneme sequence obtained by applying continuous phoneme recognition to the recognition candidate speech 801. The central processing unit 1 stores the extracted feature parameters in the recognition candidate feature parameters 602 in the dictionary entry generated in step S26.

After that, the process returns to step S1.

The central processing unit 1 checks in step S14 if the event acquired in step S1 is pressing of the speech recognition start button 204. If pressing of the speech recognition start button 204 is detected, the process advances to step S15; otherwise, the process advances to step S25.

Step S15 and subsequent steps correspond to processing at the time of execution of speech recognition. In step S15, the central processing unit 1 acquires speech which is to undergo speech recognition from the speech input unit 3, and stores it in the RAM 8 as recognition target speech 807.

In step S16, the central processing unit 1 extracts feature parameters of the acquired recognition target speech. Examples of the feature parameters include a cepstrum obtained by applying signal processing to the recognition target speech, a phoneme sequence obtained by applying continuous phoneme recognition to the recognition target speech, and the like. Note that the feature parameters obtained in this step are not always of the same type as the recognition candidate feature parameters used in step S5 above. These feature parameters depend on a method used in step S17 to be described below. The central processing unit 1 stores the acquired feature parameters of the recognition target speech in the RAM 8 as recognition target feature parameters 808.

In step S17, the central processing unit 1 calculates the distances between the recognition target feature parameters extracted in step S16, and the recognition candidate feature parameters in respective dictionary entries stored in the recognition dictionary 605. For example, if these feature parameters are parameter sequences like cepstra, the distances are calculated by dynamic programming (DP matching). If these feature parameters are phoneme sequences, processing based on phoneme similarities is executed. Alternatively, if one is a parameter sequence and the other is a phoneme sequence, a likelihood calculation for an HMM (Hidden Markov Model) corresponding to the phoneme sequence is done (in this case, a phoneme sequence with a high likelihood is handled as that having a small distance).

In step S18, the central processing unit 1 acquires a dictionary entry having recognition candidate feature parameters with a smallest distance as a result of step S17 as a recognition result dictionary entry.

In step S19, the central processing unit 1 acquires recognition result confirmation speech in the recognition result dictionary entry from the external storage unit 6, and stores it in the RAM 8 as output speech 809.

The central processing unit 1 checks in step S20 if BGM is to be added to the recognition result confirmation speech. As a result of checking, if "yes (add BGM)" in step S20, the process advances to step S21; if "no (not add BGM)" in step S20, the process jumps to step S23.

Figure 9:
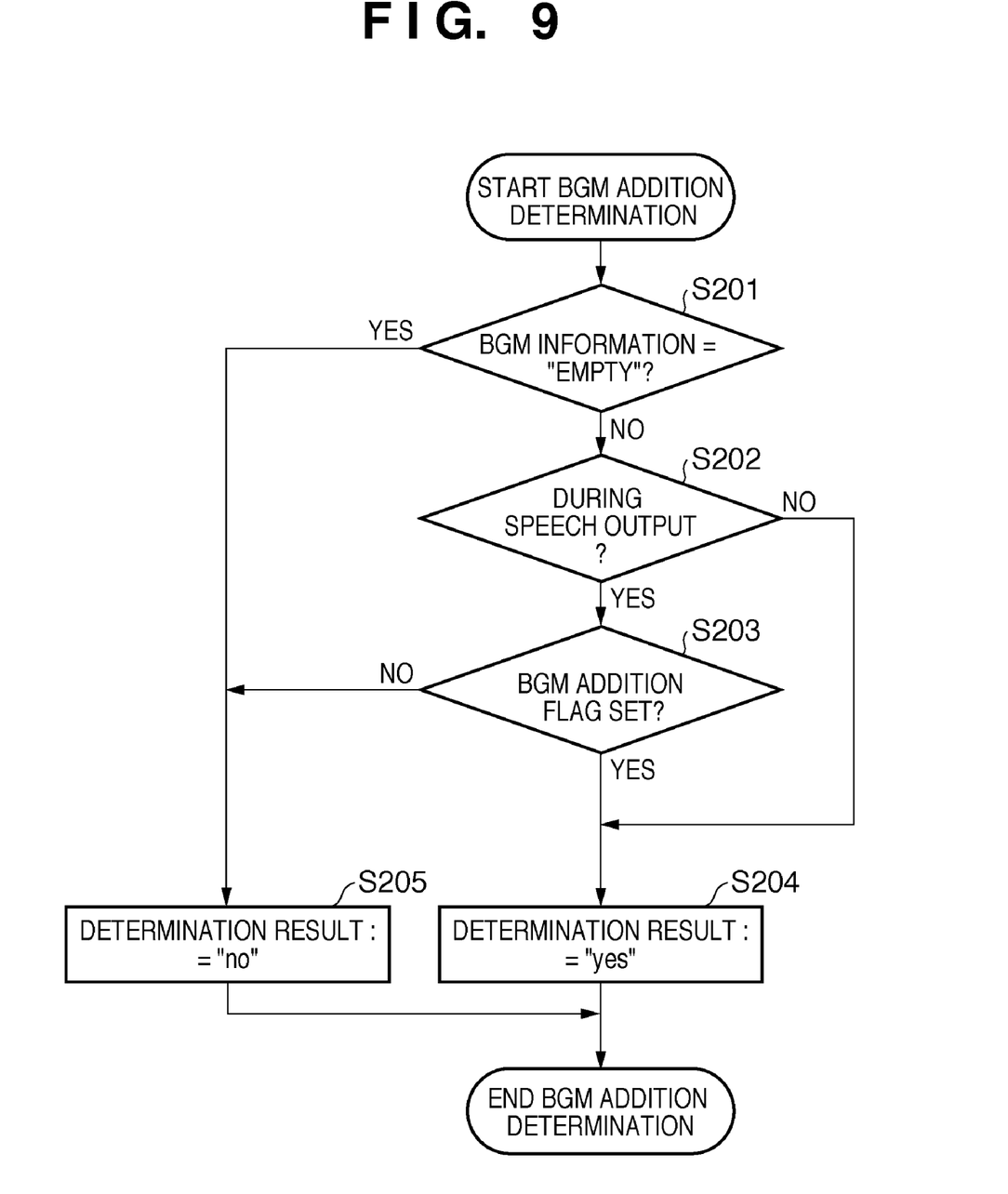
FIG. 9 is a flowchart showing the processing sequence for determining whether or not to add BGM.

Details of determination as to whether to add BGM will be described below with reference to FIG. 9.

The central processing unit 1 checks in step S201 if the BGM information 607 in the recognition result dictionary entry is "empty". As a result of checking, if the BGM information in the recognition result dictionary entry is "empty", the process advances to step S205; otherwise, the process advances to step S202.

The central processing unit 1 checks in step S202 if a speech output of the speech output unit 5 is in progress. As a result of checking, if the speech output of the speech output unit 5 is in progress, the process advances to step S203; otherwise, the process jumps to step S204.

The central processing unit 1 checks in step S203 if the BGM addition flag 608 in the recognition result dictionary entry is set to be "1". As a result of checking, if the BGM addition flag is "1", the process advances to step S204; otherwise, the process advances to step S205.

In step S204, the central processing unit 1 determines "yes (add BGM)" as the determination result as to whether to add BGM.

In step S205, the central processing unit 1 determines "no (not add BGM)" as the determination result as to whether to add BGM.

After step S204 or S205, the central processing unit 1 ends the determination processing as to whether to add BGM.

Details of the determination processing (step S20) as to whether or not to add BGM have been described.

In step S21, the central processing unit 1 acquires BGM corresponding to the contents of the BGM information 607 in the recognition result dictionary entry from the external storage unit 6.

In step S22, the central processing unit 1 adds the BGM acquired in step S21 to the recognition result confirmation speech held in the output speech 809. At this time, the central processing unit 1 adds the BGM based on the set relationship with reference to the BGM addition position 609 in the recognition result dictionary entry. For example, if it is set to start the BGM prior to the recognition result confirmation speech, the central processing unit 1 adds the BGM by shifting its start position to that before the recognition result confirmation speech. The central processing unit 1 stores the recognition result confirmation speech added with the BGM in the output speech 809 again.

In step S23, the central processing unit 1 outputs the recognition result confirmation speech held in the output speech 809 to the speech output unit 5.

In step S24, the central processing unit 1 executes processing corresponding to the recognition candidate corresponding operation in the recognition result dictionary entry obtained in step S18. For example, if a key code sequence is recorded as the recognition candidate corresponding operation, the central processing unit 1 issues a corresponding key pressing event sequence. In this manner, processing equivalent to pressing of a series of keys is done.

After step S24, the process returns to step S1.

In step S25, the central processing unit 1 executes event processing corresponding to the event acquired in step S1. For example, if the event acquired in step S1 is pressing of one of the function buttons 202, the central processing unit 1 executes processing corresponding to the function button 202. After step S25, the process returns to step S1.

According to the aforementioned embodiment, since BGM is added upon playing back the speech upon registration, which corresponds to the recognition result, for the purpose of confirmation of the speech recognition result, the recognizability by the user improves, thus allowing easy confirmation of the speech recognition result. At this time, speech is emphasized by noise suppression. Furthermore, the user need not to listen to redundant periods by silent period removal, and can listen to only a required period. Moreover, due to a masking effect by adding BGM, the user is not so distracted by the presence of unwanted noise in the speech. At least one of the aforementioned additions of BGM, noise suppression, and silent period removal need only be executed as a modification of speech data for the purpose of improvement of auditory sound quality. Furthermore, using BGM corresponding to the speech recognition result, the user can confirm the speech recognition result during the BGM period. Furthermore, the setting of the relationship between the playback start positions of the BGM and recognition result confirmation speech helps confirmation of the speech recognition result by the BGM.

In the above embodiment, the noise suppression (step S8) and silent period removal (step S9) with respect to the recognition candidate speech are executed prior to speech recognition, but they may be executed after acquisition of recognition result confirmation speech (step S19). In this case, the calculation volume after acquisition of the recognition result confirmation speech increases, but processing for adjusting a noise suppression amount according to a device operation environment upon speech recognition can be executed.

On the other hand, execution of the noise suppression and silent period removal with respect to the recognition candidate speech prior to speech recognition like in the above embodiment provides an effect of a reduction of the calculation volume. That is, since the recognition result confirmation speech has already undergone the noise suppression and silent period removal, these calculations need not be executed at the time of speech recognition.

In the above embodiment, BGM is added after acquisition of recognition result confirmation speech, but it may be added prior to speech recognition. In this case, whether or not to add BGM cannot be selected, but the calculation volume after acquisition of recognition result confirmation speech can be reduced.

In the above embodiment, a plurality of types of BGM are prepared, and have correspondence with recognition result confirmation speech. However, such correspondence is not indispensable if only the masking effect is expected.

In the above embodiment, the recognition candidate feature parameters are extracted from the recognition candidate speech. However, information obtained during the process of the noise suppression (step S8) may be used. For example, when a cepstrum is used as feature parameters, power spectrum calculations are required during the process of cepstrum extraction. Hence, the calculation volume can be reduced by using the recognition candidate power spectrum 803. Alternatively, by calculating the recognition candidate feature parameters using the noise-suppressed power spectrum 805 or noise-suppressed speech 806, it is effective to implement speech recognition with high noise resistance.

In the above embodiment, the noise information (noise power spectrum) is extracted from silent periods of the recognition candidate (step S7). However, the noise information may be extracted by other means. For example, speech may always be input from the speech input unit 3 independently of the operation of the recognition candidate input start button (registration button) 201 or the speech recognition start button 204, and noise information may be extracted from the input speech. In this way, noise information can be appropriately extracted even when the user utters immediately after pressing of the recognition candidate input start button 201.

In the above embodiment, speech is generated by adding BGM to recognition result confirmation speech. However, when the speech output unit 5 is configured to accept a plurality of inputs, the recognition result confirmation speech and BGM need only be output to the speech output unit 5.

In the above embodiment, the operation corresponding to the recognition result is executed immediately after playback of the recognition result confirmation speech (step S23). However, that operation may be executed after the confirmation operation of the user.

In the above embodiment, the device operation is associated with the recognition result. However, the device operation need not always be associated with the recognition result. For example, the contents displayed on the output unit 4, device setting states, and the like may be associated with the recognition result.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention can be implemented by a computer, the program code installed in the computer also implements the present invention. In other words, the present invention also covers a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-174571, filed Jul. 2, 2007, and Japanese Patent Application No. 2008-158555, filed Jun. 17, 2008, which are hereby incorporated by reference herein in their entirety.

What is claimed is:

1. A speech recognition apparatus comprising:
    a first obtaining unit configured to obtain speech;
    a modification unit configured to modify the speech obtained by the first obtaining unit;
    an extraction unit configured to extract feature parameters of the speech obtained by the first obtaining unit;
    a storage unit configured to store the feature parameters and the modified speech in association with the feature parameters;
    a second obtaining unit configured to obtain speech to be recognized;
    a speech recognition unit configured to execute speech recognition of the speech obtained by the second obtaining unit based on the feature parameters stored on the storage unit;
    a playback unit configured to playback the modified speech associated with the feature parameters having a best score in the speech recognition;
    a selection unit configured to select a background sound; and
    a setting unit configured to set a condition for playback of the background sound,
    wherein the storage unit is further configured to store the background sound and the condition for playback of the background sound, and
    wherein the playback unit is configured to play the modified speech associated with the feature parameters having the best score in the speech recognition based on the background sound and the condition for playback of the background sound.

2. The apparatus according to claim 1, wherein the modification unit is configured to modify the speech by performing at least one of noise suppression, silent period removal, and addition of a background sound.

3. A method for recognizing speech, comprising:
    obtaining speech;
    modifying the speech;
    extracting feature parameters of the modified speech;
    storing the feature parameters;
    storing the modified speech in association with the feature parameters;
    obtaining speech to be recognized;
    executing speech recognition of the speech to be recognized based on the stored feature parameters;
    playing back the modified speech associated with the feature parameters having a best score in the speech recognition;
    selecting a background sound;
    setting a condition for playback of the background sound,
    storing the background sound and the condition for playback of the background sound; and
    playing back the modified speech associated with the feature parameters having the best score in the speech recognition based on the background sound and the condition for the playback of the background sound.

4. The method according to claim 3, wherein modifying the speech includes at least one of suppressing noise, removing a silent period, and adding a background sound.

* * * * *